(12) United States Patent
Chan

(10) Patent No.: US 10,271,528 B1
(45) Date of Patent: Apr. 30, 2019

(54) DOUBLE PLOPPER

(71) Applicant: RIVER2SEA, LLC, Richmond, CA (US)

(72) Inventor: Kwok Kong Chan, Richmond, CA (US)

(73) Assignee: RIVER2SEA, LLC, Vacaville, CA (US)

( * ) Notice: Subject to any disclaimer, the term of this patent is extended or adjusted under 35 U.S.C. 154(b) by 133 days.

(21) Appl. No.: 15/643,406

(22) Filed: Jul. 6, 2017

Related U.S. Application Data

(60) Provisional application No. 62/359,637, filed on Jul. 7, 2016.

(51) Int. Cl.
*A01K 85/10* (2006.01)
*A01K 85/01* (2006.01)
*A01K 85/16* (2006.01)

(52) U.S. Cl.
CPC .............. *A01K 85/01* (2013.01); *A01K 85/10* (2013.01); *A01K 85/16* (2013.01)

(58) Field of Classification Search
CPC ......... A01K 85/10; A01K 85/16; A01K 85/01
USPC ....................................................... 43/42.13
See application file for complete search history.

(56) References Cited

U.S. PATENT DOCUMENTS

| | | | | |
|---|---|---|---|---|
| 2,306,692 A | * | 12/1942 | Flood | A01K 85/16 43/42.21 |
| 2,821,044 A | * | 1/1958 | Bateman | A01K 85/16 43/42.16 |
| 2,900,754 A | * | 8/1959 | Orlik | A01K 85/16 43/42.47 |
| 3,257,750 A | * | 6/1966 | Shannon | A01K 85/00 43/42.06 |
| 3,505,753 A | * | 4/1970 | Henderson | A01K 85/16 43/26.2 |
| 5,050,334 A | * | 9/1991 | Standish, Jr. | A01K 85/01 43/42.13 |
| 5,138,789 A | * | 8/1992 | Hood | A01K 85/10 43/42.13 |
| 5,911,570 A | * | 6/1999 | Freitas | A01K 85/00 43/42.13 |
| 7,467,491 B1 | * | 12/2008 | Slocum | A01K 85/00 43/42.13 |
| 2004/0221502 A1 | * | 11/2004 | Eubanks | A01K 85/00 43/42.13 |
| 2006/0005458 A1 | * | 1/2006 | Maki | A01K 85/00 43/42.13 |
| 2007/0277423 A1 | * | 12/2007 | Edwards | A01K 85/00 43/42.13 |

(Continued)

FOREIGN PATENT DOCUMENTS

WO   WO-2018165506 A1 * 9/2018 ............. A01K 85/12

*Primary Examiner* — Christopher P Ellis
(74) *Attorney, Agent, or Firm* — Richard T. Ogawa; Ogawa P.C.

(57) ABSTRACT

A fishing-lure device. The device having a pair of blades or impellers each of which is configured in parallel arrangement with a bait and act as floating wings positioned in in a symmetrical arrangement above the bait for attracting game fish to the bait as it is moved through the water or for suspending the bait motionless in the water. Each of the blades is configured in an off-set manner to make a gurgling and popping sound as it traverses through the body of water.

20 Claims, 17 Drawing Sheets

(56) References Cited

U.S. PATENT DOCUMENTS

| | | | | |
|---|---|---|---|---|
| 2008/0263935 A1* | 10/2008 | Albrecht | ................ | A01K 85/00 43/42.13 |
| 2010/0180488 A1* | 7/2010 | Keeton | ................ | A01K 85/00 43/42.16 |
| 2011/0308135 A1* | 12/2011 | Uhrig | ................ | A01K 85/00 43/42.19 |
| 2014/0283434 A1* | 9/2014 | Teegarden | ............ | A01K 85/10 43/42.09 |
| 2016/0165868 A1* | 6/2016 | LeHew | ................ | A01K 91/053 43/42.32 |
| 2017/0347635 A1* | 12/2017 | Sandefur | ................ | A01K 85/02 |

* cited by examiner

FIG. 1A
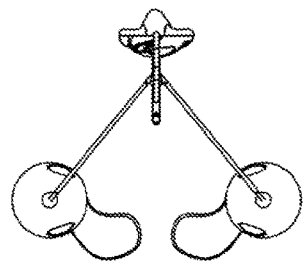
FIG. 1B            FIG. 1C            FIG. 1D
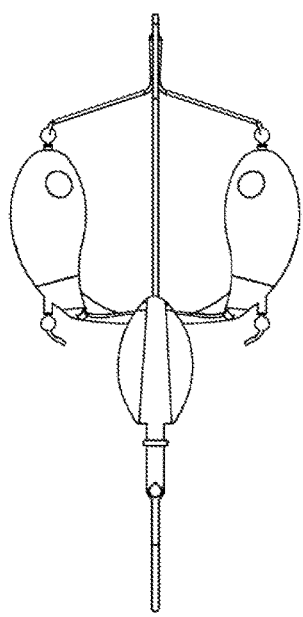 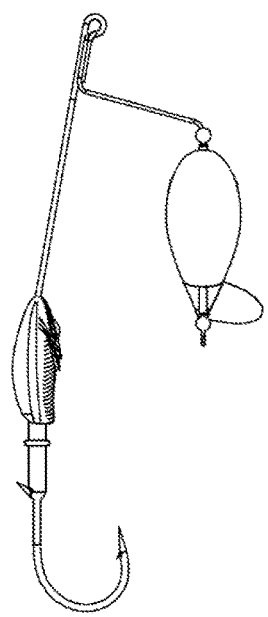 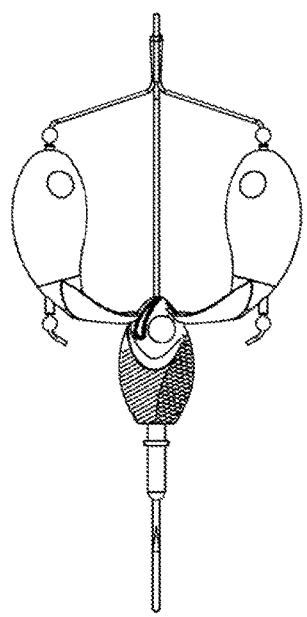
FIG. 1G
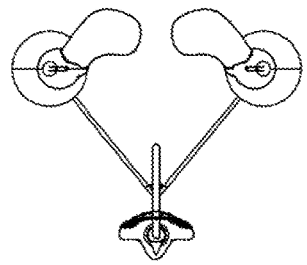
FIG. 1F
FIG. 1E
 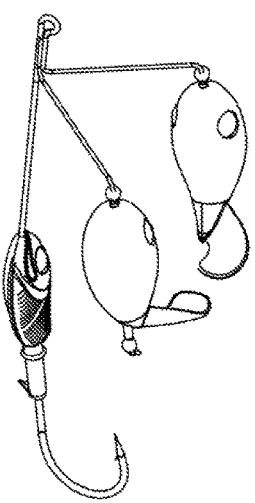

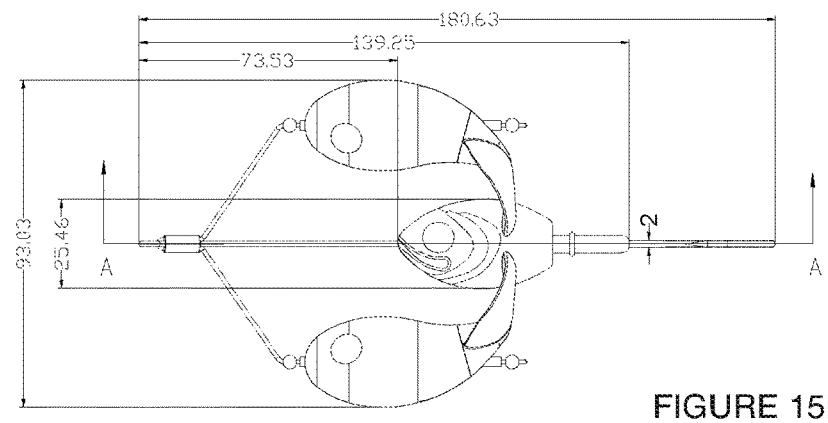
FIGURE 15B
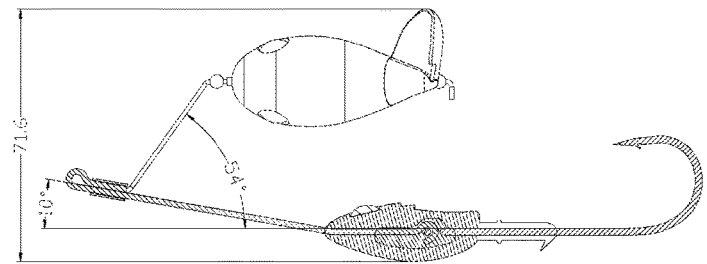
SECTION A-A
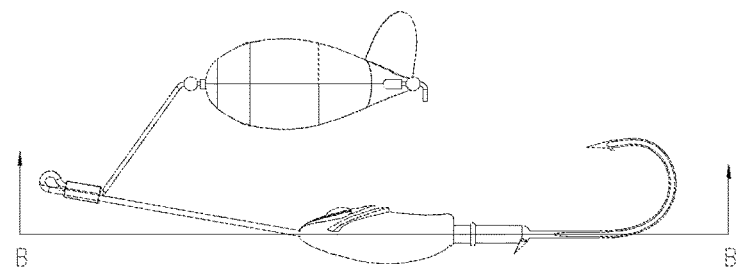
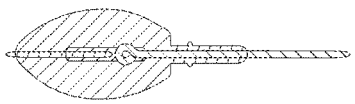
SECTION B-B

SECTION C-C

SECTION D-D

DOUBLE PLOPPER

CROSS-REFERENCE TO RELATED APPLICATION

This application claims priority to U.S. Provisional Application No. 62/359,637 filed Jul. 7, 2016, commonly assigned, and hereby incorporated in its entirety for all purposes.

BACKGROUND OF INVENTION

The present invention relates generally to fishing techniques and in particular to fishing lures. More particularly, the invention provides a floating spinner bait lure and method, which can act as a spinner bait or buzz bait or popper, or even stop and float like a live bait, according to a specific embodiment. Merely by way of example, the invention has been applied to a wired spinner bait or buzz bait or popper lure, but it would be recognized that other applications exist.

One of the greatest sporting activities known to mankind is fishing. Human beings involved in the activity of fishing are often called "fisherman" or "fisherwoman." Fishing often involves using a bait, whether natural or artificial, which is attached to one or more hooks that are tied to a line from a fishing rod and reel. The bait is introduced into a lake, stream, or ocean to attract and lure a fish to strike it. Once the fish strikes, sharp hooks often hidden by the bait pierce into the tissue of the fish. Often times, the fish becomes hooked in the mouth. After a struggle between the fisherman and the fish, one of them wins. Either the fisherman happily lands the fish or the fish breaks itself from the hook and swims away. At one time, fishing was performed predominantly for survival purposes to catch and eat as food and enjoy for a meal. More recently, fisherman now participate in the act of fishing purely for the "sport" of catching the fish, which is often released back into the water after it has been caught. Sport fisherman often use artificial baits to entice and catch the fish.

In sport fishing, artificial bait is often called a lure, which is an object attached to the end of the fishing line. The artificial bait is often designed to resemble and move like an item of fish prey. See, http://en.wikipedia.org. Often times, the lure is equipped with one or more hooks that hold the fish attracted to the lure. Lures can be made using hard plastic, soft plastics, metal, wood, and any of their combinations. A wide variety of colors can also be used on the lures.

Many types of fishing lures exist. Lures often imitate smaller bait fish, snakes, ducks, crawfish, worms, and other small animals capable of attracting a larger predatory fish. An example of a fishing lure for large predatory fish such as black bass is a buzz bait or spinner bait. All of these baits can be fished on the surface, and can sink quickly. These baits, however, have difficulty a slow retrieve since they sink quickly.

From the above, it is seen that improved techniques for lure designs are highly desired.

BRIEF SUMMARY OF THE INVENTION

The present invention relates generally to fishing techniques and in particular to fishing lures. More particularly, the invention provides a floating spinner bait lure and method, which can act as a spinner bait or buzz bait or popping bait, or even stop and float like a live bait, according to a specific embodiment. Merely by way of example, the invention has been applied to a wired spinner bait or buzz or popper bait lure, but it would be recognized that other applications exist.

In an example, the invention provides a fishing lure device. The device having a pair of blades each of which is configured in parallel arrangement with a bait and act as floating wings for the bait as it is moved through the water or suspended motionless in the water. Each of the blades is configured in an off-set manner to make a gurgling and popping sound as it traverses through the body of water. Each of the blades can also be formed to resemble the shape and color of the bait, which is suspended under the pair of blades, to resemble a pair of baits for attracting fish and one bait with a hook.

In an example, the present invention provides a fishing lure device. The device having a pair of blades or impellers each of which is configured in parallel arrangement with a bait and act as floating wings positioned in a symmetrical arrangement above the bait for attracting game fish to the bait as it is moved through the water or for suspending the bait motionless in the water. Each of the blades is configured in an off-set manner to make a gurgling and popping sound as it traverses through the body of water.

In an example, the present invention provides a floating fishing lure device, although the lure can also sink in some embodiments. The device has an eye configured from a wire and having an opening to attach a fishing line thereto. The device has a first wire member having a first end extending from the eye and having a length ranging from one inch to ten inches from the first end to a second end. The device has a bait device attached to the second end. In an example, the bait has a head member, and at least one hook configured in a manner where a point of the hook is directed back toward the eye. The device has a skirt configured around a vicinity of the head member such that the skirt flutters as the bait device is moved through a body of water. The device has a pair of support wires each of which is extending from the eye and each of which has a first length configured in a parallel manner to the first wire, and abutting the first wire. In an example, the device has a first one of the pair of support wires extending from the first length and a second one of the pair of support wires extending from the first length such that the first one of the pair of support wires and the second one of the pair of support wires forms a v-shaped configuration in symmetry about the first wire member and having an angle defining the v-shaped member ranging from 90 (or 120 Degrees) Degrees to 30 Degrees, as viewed from an upper region of the v-shaped member, while the first wire is configured between the first one of the pair of support wires and the second one of the support wires. In an example, the device has a first angle defining a first shape of the first one of the pair of support wires in reference to the first wire member when viewed from a side region of the bait device and a second angle defining second shape of the second one of the pair of support wires in reference to the first wire member when viewed from the side region of the bait device. In an example, the device has a first support region configured from a first end portion of the first one of the pair of support wires. In an example, the first support region is configured in a parallel manner to the length of the first wire. The device has a second support region configured from a second end portion of the second one of the pair of support wires. In an example, the first support region is configured in a parallel manner to the length of the first wire. In an example, the device has a first height defining a first gap between the length of the first wire and the second support wire and a second height defining a second gap between the length of the first wire and the second support wire. In an example, the device has a first floating member configured on the first support region and a second floating member configured on the second support region, such that the first floating member and the second floating member cause the bait device to suspend motionless in the body of water, while the first floating member and the second floating member are motionless in the body of water. The device has a first single blade impeller configured using an opening on the impeller to communicate to the first support region and a second single blade impeller configured using an opening on the impeller to communicate to the first support region, such that each of the first single blade impeller and the second single blade impeller spin and cause a gurgling sound as the bait device is pulled through the body of water at a first retrieving speed.

In an example, the present invention provides a floating fishing lure device, although the lure can also sink in some embodiments. The device has an eye configured from a wire and having an opening to attach a fishing line thereto. The device has a first wire member having a first end extending from the eye and having a length ranging from one inch to ten inches from the first end to a second end. The device has a bait device attached to the second end. In an example, the bait has a head member, and at least one hook configured in a manner where a point of the hook is directed back toward the eye. Optionally, the device has a skirt or other feature configured around a vicinity of the head member such that the skirt flutters as the bait device is moved through a body of water. The device has a pair of support wires each of which is extending from the eye and each of which has a first length configured in a parallel manner to the first wire, and abutting the first wire. In an example, the device has a first one of the pair of support wires extending from the first length and a second one of the pair of support wires extending from the first length such that the first one of the pair of support wires and the second one of the pair of support wires forms a v-shaped configuration in symmetry about the first wire member and having an angle defining the v-shaped member ranging from 90 (or 120 Degrees) Degrees to 30 Degrees, as viewed from an upper region of the v-shaped member, while the first wire is configured between the first one of the pair of support wires and the second one of the support wires. In an example, the device has a first angle defining a first shape of the first one of the pair of support wires in reference to the first wire member when viewed from a side region of the bait device and a second angle defining second shape of the second one of the pair of support wires in reference to the first wire member when viewed from the side region of the bait device. In an example, the device has a first support region configured from a first end portion of the first one of the pair of support wires. In an example, the first support region is configured in a parallel manner to the length of the first wire. The device has a second support region configured from a second end portion of the second one of the pair of support wires. In an example, the first support region is configured in a parallel manner to the length of the first wire. In an example, the device has a first height defining a first gap between the length of the first wire and the second support wire and a second height defining a second gap between the length of the first wire and the second support wire. In an example, the device has a first floating member configured on the first support region and a second floating member configured on the second support region, such that the first floating member and the second floating member cause the bait device to suspend motionless in the body of water, while the first floating member and the second floating member are motionless in the body of water. The device has a first single blade impeller configured using an opening on the impeller to communicate to the first support region and a second single blade impeller configured using an opening on the impeller to communicate to the first support region, such that each of the first single blade impeller and the second single blade impeller spin and cause a gurgling sound as the bait device is pulled through the body of water at a first retrieving speed.

One or more benefits can be achieved using the present invention over conventional techniques. The present invention can be made using conventional materials and components according to a specific embodiment. Additionally, the invention can be applied to a buzz bait or spinner bait lure and other like lures. In a preferred embodiment, the present invention provides a floating popping lure to simulate a swimming action and can stop via its floating design. These and other benefits have been described throughout the present specification and more particularly below.

Various additional objects, features and advantages of the present invention can be more fully appreciated with reference to the detailed description and accompanying drawings that follow.

BRIEF DESCRIPTION OF DRAWINGS

FIG. 1A is a front-view diagram of a lure device according to an example of the present invention.

FIG. 1B is a bottom-view diagram of a lure device according to an example of the present invention.

FIG. 1C is a side-view diagram of a lure device according to an example of the present invention.

FIG. 1D is a top-view diagram of a lure device according to an example of the present invention.

FIG. 1E is detailed view diagram of a portion of lure device according to an example of the present invention.

FIG. 1F is a perspective-view diagram of a lure device according to an example of the present invention.

FIG. 1G is a back-view diagram of a lure device according to an example of the present invention.

FIGS. 15A, 15B, and 15C are various illustrations of a lure device according to an example of the present invention.

DETAILED DESCRIPTION OF THE EXAMPLES

Figure 2:
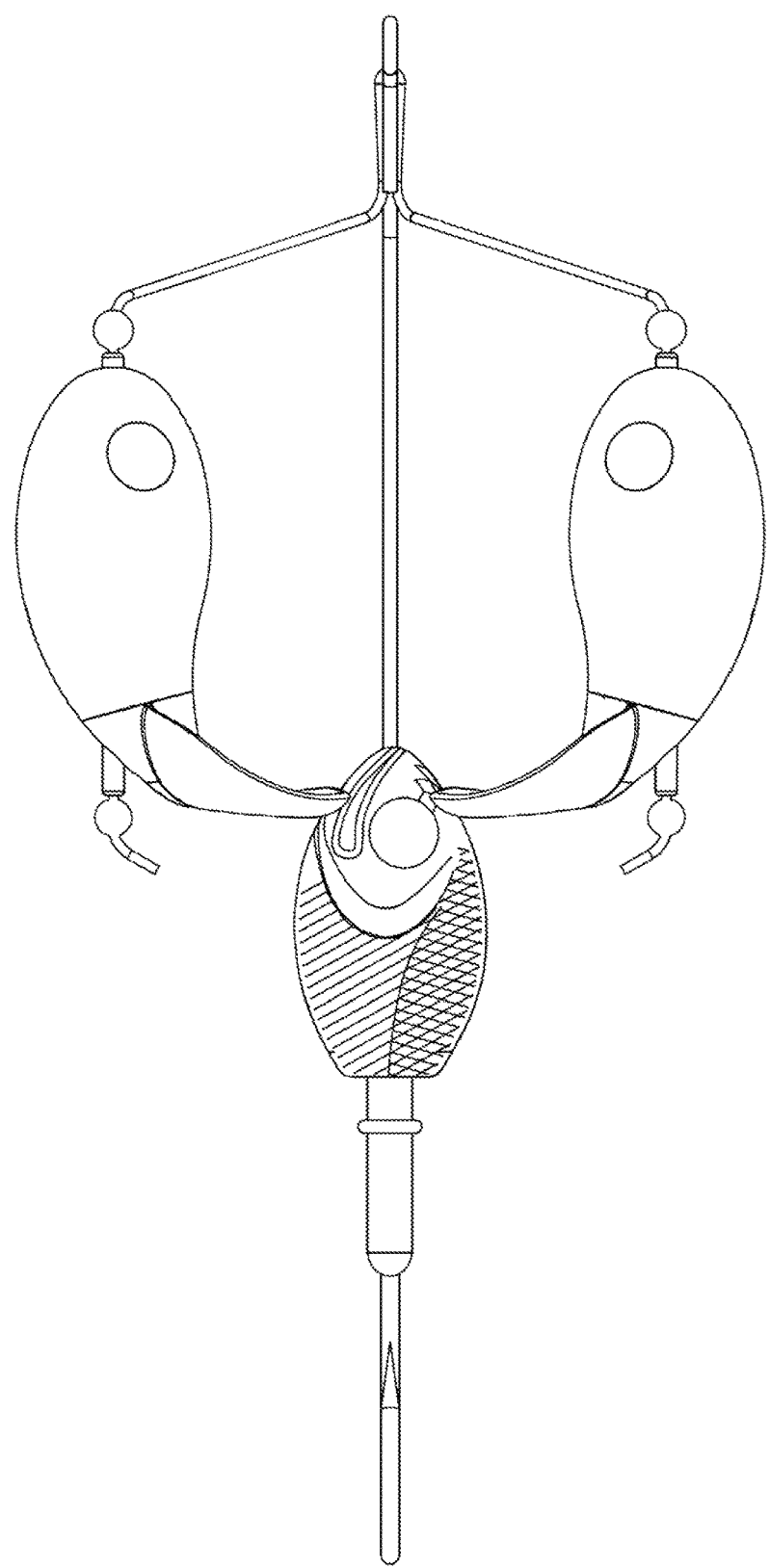
FIG. 2 is a top-view diagram of a lure device according to an example of the present invention.

The present invention relates generally to fishing techniques and in particular to fishing lures. More particularly, the invention provides a floating spinner bait lure and method, which can act as a spinner bait or buzz bait or popper, or even stop and float like a live bait, according to a specific embodiment. Merely by way of example, the invention has been applied to a wired spinner bait or buzz bait or popper lure, but it would be recognized that other applications exist.

In an example, the present invention provides a floating fishing lure device, although the lure can also sink in some embodiments. The device has an eye configured from a wire and having an opening to attach a fishing line thereto. The device has a first wire member having a first end extending from the eye and having a length ranging from one inch to ten inches from the first end to a second end. The device has a bait device attached to the second end. In an example, the bait has a head member, and at least one hook configured in a manner where a point of the hook is directed back toward the eye. Optionally, the device has a skirt or other feature configured around a vicinity of the head member such that the skirt flutters as the bait device is moved through a body of water. The device has a pair of support wires each of which is extending from the eye and each of which has a first length configured in a parallel manner to the first wire, and abutting the first wire. In an example, the device has a first one of the pair of support wires extending from the first length and a second one of the pair of support wires extending from the first length such that the first one of the pair of support wires and the second one of the pair of support wires forms a v-shaped configuration in symmetry about the first wire member and having an angle defining the v-shaped member ranging from 90 (or 120 Degrees) Degrees to 30 Degrees, as viewed from an upper region of the v-shaped member, while the first wire is configured between the first one of the pair of support wires and the second one of the support wires. In an example, the device has a first angle defining a first shape of the first one of the pair of support wires in reference to the first wire member when viewed from a side region of the bait device and a second angle defining second shape of the second one of the pair of support wires in reference to the first wire member when viewed from the side region of the bait device. In an example, the device has a first support region configured from a first end portion of the first one of the pair of support wires. In an example, the first support region is configured in a parallel manner to the length of the first wire. The device has a second support region configured from a second end portion of the second one of the pair of support wires. In an example, the first support region is configured in a parallel manner to the length of the first wire. In an example, the device has a first height defining a first gap between the length of the first wire and the second support wire and a second height defining a second gap between the length of the first wire and the second support wire. In an example, the device has a first floating member configured on the first support region and a second floating member configured on the second support region, such that the first floating member and the second floating member cause the bait device to suspend motionless in the body of water, while the first floating member and the second floating member are motionless in the body of water. The device has a first single blade impeller configured using an opening on the impeller to communicate to the first support region and a second single blade impeller configured using an opening on the impeller to communicate to the first support region, such that each of the first single blade impeller and the second single blade impeller spin and cause a gurgling sound as the bait device is pulled through the body of water at a first retrieving speed. Further details of the present invention can be found throughout the specification and more particularly below.

In an example to the described examples, the first gap and the second gap is equal in distance. In an example, each of the first floating member and the second floating member is configured from a floating plastic or other material in an egg shaped manner. In an example, each of the first single blade impeller and the second single blade impeller spin and cause a buzzing sound as the bait device is pulled through the body of water at a second retrieving speed, the second retrieving speed is faster than the first retrieving speed. In an example, each of the first single blade impeller and the second single blade impeller spin and cause a popping sound as the bait device is pulled through the body of water at a third retrieving speed, the third retrieving speed is faster than the second retrieving speed. In an example, the bait device comprises a solid metal head material. In an example, each of the first single blade impeller and the second single blade impeller extends to the head member and not beyond the head member to allow the hook to be in a weed-less configuration such that the v-shaped member and each of the first single blade impeller and the second single blade impeller acts as a block for weeds as the device is pulled through the body of water. In an example, the first angle ranges from about 45 Degrees to 90 Degrees. In an example, the first single blade impeller is exposed to the body of water; and wherein the second single blade impeller is exposed to the body of water. In an example, the first floating member and the second floating member are configured with air or other floating material suitable to cause the bait device to suspend and not sink into the body of water while the bait is in a motionless state. In an example, the first single blade impeller comprises a bearing or bushing coupled to the first support wire; and wherein the second single blade impeller comprises a bearing or bushing coupled to the second support wire, each bearing or bushing facilitating rotation of each of the first single blade impeller and the second single blade impeller. In an example, the bait device is shaped as a flat blade member and configured such that each side of the blade member is substantially parallel to a surface region of the body of water. In an example, the first single blade impeller and the second single blade impeller turn in an opposite direction from each other, and each of the first single blade impeller and the second single blade impeller turn in a direction toward each other or turn in a direction away from each other.

In an example, the first single blade comprises a first cone shaped structure having a first base and a first cone end formed in an off-set manner to a straight line running from the base to an outer side region of the first cone end, a first single j shaped blade coupled to the first cone end, a first opening extending straight along the straight line from the first base to the outer side region of the first cone end such that the first single j shaped blade is configured on an inner side region of the first cone, and the first single blade is coupled to the first wire support in an off-set manner to cause the first single blade to rotate about the first wire support in an off-set manner to cause the first single blade impeller to cause a gurgle and popping sound as the first single blade impeller moves and rotates through the body of water. In an example, the second single blade comprises a second cone shaped structure having a second base and a second cone end formed in an off-set manner to a straight line running from the base to an outer side region of the second cone end, a second single j shaped blade coupled to the second cone end, a second opening extending straight along the straight line from the second base to the outer side region of the second cone end such that the second single j shaped blade is configured on an inner side region of the second cone, and the second single blade is coupled to the second wire support in an off-set manner to cause the second single blade to rotate about the second wire support in an off-set manner to cause the second single blade impeller to cause a gurgling and popping sound as the second single blade impeller moves and rotates through the body of water. In an example, the first single j blade comprises a first end having a first blunt shape, and wherein the second single j blade comprises a second end having a second blunt shape. These and other features are described in more detail throughout the present specification and more particularly below.

Various views of the present lure device can be found in the following drawings. FIG. 1A is a front-view diagram of a lure device according to an example of the present invention. FIG. 1B is a bottom-view diagram of a lure device according to an example of the present invention. FIG. 1C is a side-view diagram of a lure device according to an example of the present invention. FIG. 1D is a top-view diagram of a lure device according to an example of the present invention. FIG. 1E is detailed view diagram of a portion of lure device according to an example of the present invention. FIG. 1F is a perspective-view diagram of a lure device according to an example of the present invention. FIG. 1G is a back-view diagram of a lure device according to an example of the present invention. More detailed expanded drawings are provided below.

FIG. 2 is a top-view diagram of a lure device according to an example of the present invention. As shown, n an example, the present invention provides a floating fishing lure device, although the lure can also sink in some embodiments. The device has an eye configured from a wire and having an opening to attach a fishing line thereto. In an example, the wire is made of a suitable metal such as a piano wire, or other stiff wire suitable for bending into the shown shape and configuration. In an example, the device has a first wire member having a first end extending from the eye and having a length ranging from one inch to ten inches from the first end to a second end, although there can be other lengths.

In an example, the device has a bait device attached to the second end. In an example, the bait has a head member, and at least one hook configured in a manner where a point of the hook is directed back toward the eye. In an example, the bait device can also have a pair of hooks or other multiple of hooks. Optionally, the device has a skirt or other feature configured around a vicinity of the head member such that the skirt flutters as the bait device is moved through a body of water. In an example, the skirt can be replaced with a soft plastic member, or other bait like feature or element. Of course, there can be other variations, modifications, and alternatives.

In an example, the device has a pair of support wires each of which is extending from the eye and each of which has a first length configured in a parallel manner to the first wire, and abutting the first wire. In an example, the pair of support wires are bundled with the first wire, and clamped together, or welded together, or fastened in other ways to keep the wires together in an example, as shown.

In an example, the device has a first one of the pair of support wires extending from the first length and a second one of the pair of support wires extending from the first length such that the first one of the pair of support wires and the second one of the pair of support wires forms a v-shaped configuration in symmetry about the first wire member and having an angle defining the v-shaped member. In an example, the v-shaped member forms an acute angle ranging from 90 (or 120 Degrees) Degrees to 30 Degrees, as viewed from an upper region of the v-shaped member (as in FIG. 2, for example), while the first wire is configured between the first one of the pair of support wires and the second one of the support wires. That is, the first wire appears to divide and intersect the pair of support wires, in an example. See also other Figures.

Figure 3:
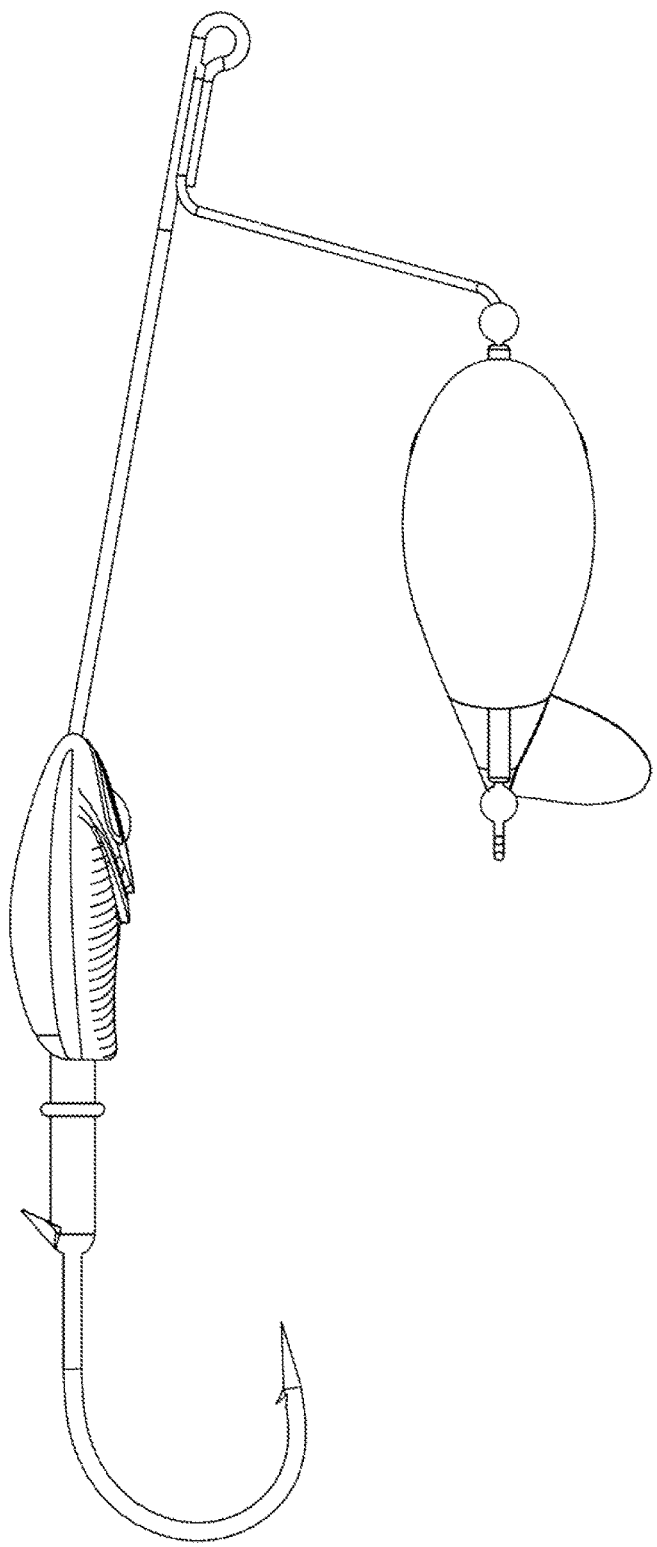
FIG. 3 is a side-view diagram of a lure device according to an example of the present invention.

In an example, the device has a first angle defining a first shape of the first one of the pair of support wires in reference to the first wire member when viewed from a side region (as shown in FIG. 3, for example) of the bait device and a second angle defining second shape of the second one of the pair of support wires in reference to the first wire member when viewed from the side region of the bait device. In an example, the device has a first support region configured from a first end portion of the first one of the pair of support wires. In an example, the first support region is configured in a parallel manner to the length of the first wire. The device has a second support region configured from a second end portion of the second one of the pair of support wires. In an example, the first support region is configured in a parallel manner to the length of the first wire. In an example, the device has a first height defining a first gap between the length of the first wire and the second support wire and a second height defining a second gap between the length of the first wire and the second support wire. As shown in the Figures, each of the support wires is configured as a pair of supports for each of the floating members, as will be described.

In an example, the pair of floating members each of which is configured on the supports acts as "floating wings" for the bait, where each of the wings is configured to flutter and/or turn as it traverses through the water, and elevate the bait in a suspended manner when the bait is motionless or stopped upon a retrieve or cast. In an example, the device has a first floating member configured on the first support region and a second floating member configured on the second support region, such that the first floating member and the second floating member cause the bait device to suspend motionless in the body of water, while the first floating member and the second floating member are motionless in the body of water. The device has a first single blade impeller configured using an opening on the impeller to communicate to the first support region and a second single blade impeller configured using an opening on the impeller to communicate to the first support region, such that each of the first single blade impeller and the second single blade impeller spin and cause a gurgling sound and/or popping sound as the bait device is pulled through the body of water at a first retrieving speed. Further details of the present invention can be found throughout the specification and more particularly below.

Figure 4:
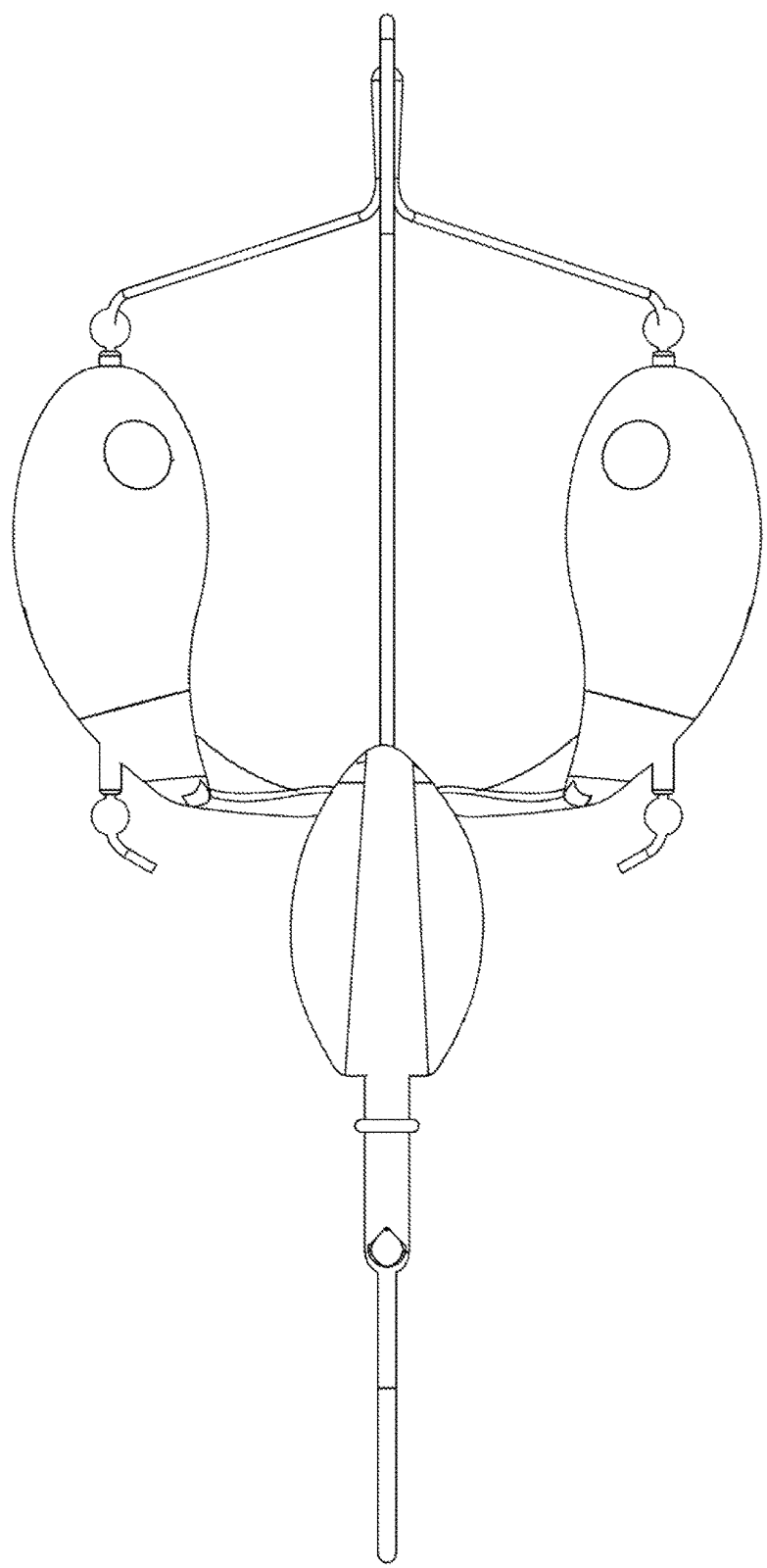
FIG. 4 is a bottom-view diagram of a lure device according to an example of the present invention.
Figure 5:
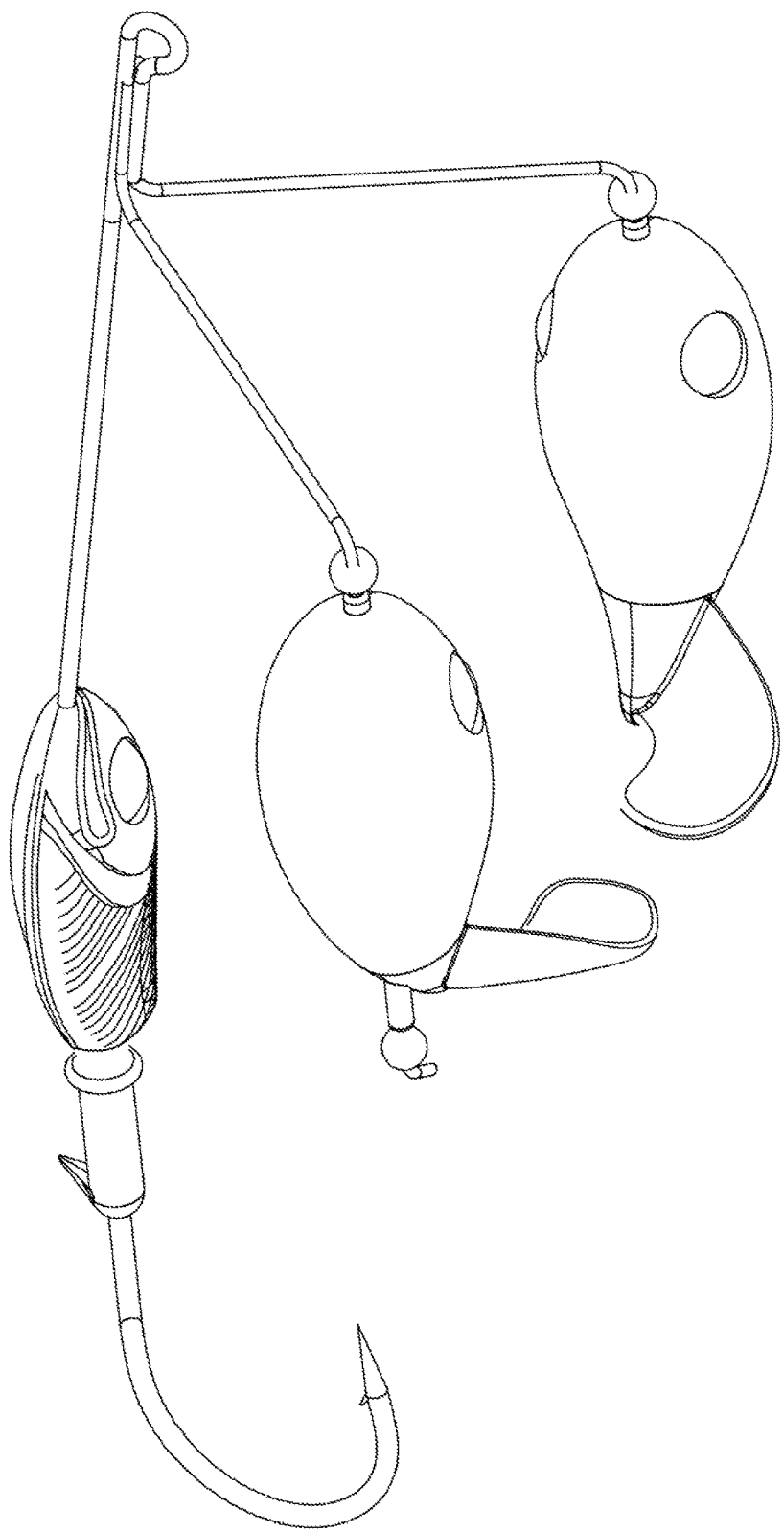
FIG. 5 is a perspective-view diagram of a lure device according to an example of the present invention.
Figure 6:
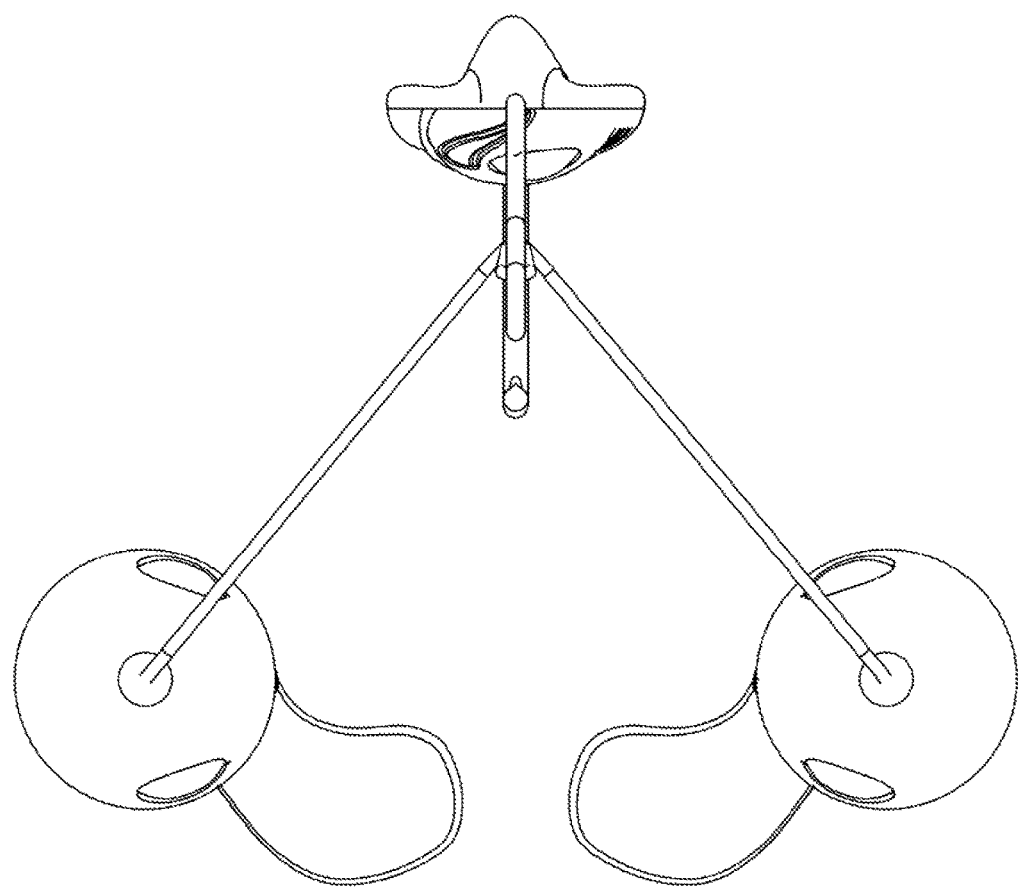
FIG. 6 is front view diagram of a lure device according to an example of the present invention.
Figure 7:
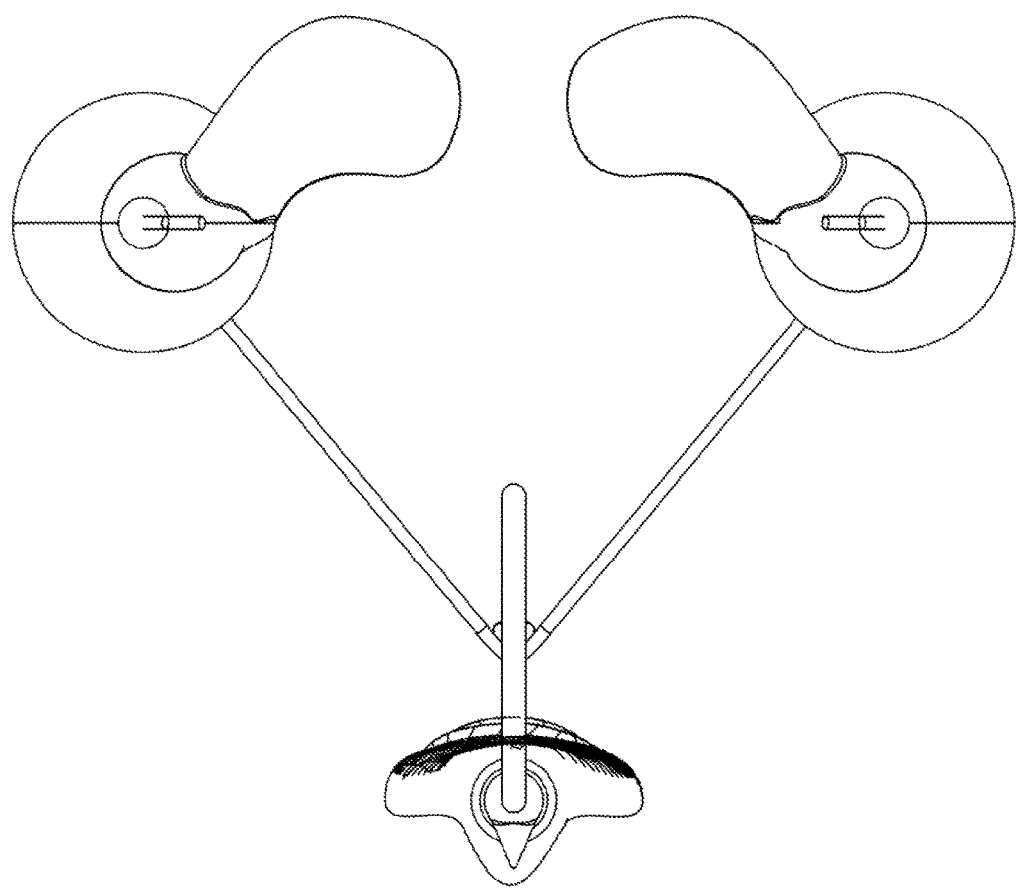
FIG. 7 is a back-view diagram of a lure device according to an example of the present invention.

FIG. 3 is a side-view diagram of a lure device according to an example of the present invention. As shown, each of the floating members is configured as a wing overlying the bait. FIG. 4 is a bottom-view diagram of a lure device according to an example of the present invention. As shown, the bait is aligned in a symmetrical arrangement with each of the floating members. FIG. 5 is a perspective-view diagram of a lure device according to an example of the present invention. FIG. 6 is front view diagram of a lure device according to an example of the present invention. FIG. 7 is a back-view diagram of a lure device according to an example of the present invention.

In an example to the described examples, in reference to the Figures, the first gap and the second gap is equal in distance. In some examples, the first gap and the second gap may not be equal in distance. In other examples, the bait can be off-set in alignment to each of the gaps, although not preferred.

In an example, each of the first floating member and the second floating member is configured from a floating plastic or other material in an egg shaped manner. Each of the floating members can include an opening to allow the member to rotate about the support wire, and each of the members is configured with a stop to prevent the member from moving along the wire in an example.

In an example, each of the first single blade impeller and the second single blade impeller spin and cause a buzzing sound as the bait device is pulled through the body of water at a second retrieving speed. In an example, the second retrieving speed is faster than the first retrieving speed. In an example, each of the first single blade impeller and the second single blade impeller spin and cause a popping sound as the bait device is pulled through the body of water at a third retrieving speed, the third retrieving speed is faster than the second retrieving speed.

In an example, the bait device comprises a solid metal head material. In other examples, the head can be a solid plastic or resin material. In other examples, the head can be made of a soft plastic, among other combinations of materials. Of course, there can be other variations, modifications, and alternatives.

In an example, each of the first single blade impeller and the second single blade impeller extends to the head member (as viewed from the side or top) and not beyond the head member to allow the hook to be in a weed-less configuration such that the v-shaped member and each of the first single blade impeller and the second single blade impeller acts as a block or weed guard for weeds as the device is pulled through the body of water. In an example, the first angle ranges from about 45 Degrees to 90 Degrees (as viewed from a side view such as FIG. 3, for example), although there can be others.

In an example, the first single blade impeller is exposed to the body of water; and wherein the second single blade impeller is exposed to the body of water. In an example, the first floating member and the second floating member are configured with air or other floating material suitable to cause the bait device to suspend and not sink into the body of water while the bait is in a motionless state. In an example, the first single blade impeller comprises a bearing or bushing or opening coupled to the first support wire; and wherein the second single blade impeller comprises a bearing or bushing or opening coupled to the second support wire, each bearing or bushing facilitating rotation of each of the first single blade impeller and the second single blade impeller.

In an example, the bait device is shaped as a flat blade member and configured such that each side of the blade member is substantially parallel to a surface region of the body of water, as shown in the Figures. Alternatively, the bait device can be shaped as an egg, or a small fish, or other bait device. In an example, the first single blade impeller and the second single blade impeller turn in an opposite direction from each other, and each of the first single blade impeller and the second single blade impeller turn in a direction toward each other or turn in a direction away from each other. In an example, the impellers turn in a manner to keep the bait tracking in a straight line or other path as it moves through the body of water. Of course, there can be other variations, modifications, and alternatives.

In an example, the first single blade comprises a first cone shaped structure having a first base and a first cone end formed in an off-set manner to a straight line running from the base to an outer side region of the first cone end, a first single j shaped blade coupled to the first cone end, a first opening extending straight along the straight line from the first base to the outer side region of the first cone end such that the first single j shaped blade is configured on an inner side region of the first cone, and the first single blade is coupled to the first wire support in an off-set manner to cause the first single blade to rotate about the first wire support in an off-set manner to cause the first single blade impeller to cause a gurgle and popping sound as the first single blade impeller moves and rotates through the body of water. In an example, the second single blade comprises a second cone shaped structure having a second base and a second cone end formed in an off-set manner to a straight line running from the base to an outer side region of the second cone end, a second single j shaped blade coupled to the second cone end, a second opening extending straight along the straight line from the second base to the outer side region of the second cone end such that the second single j shaped blade is configured on an inner side region of the second cone, and the second single blade is coupled to the second wire support in an off-set manner to cause the second single blade to rotate about the second wire support in an off-set manner to cause the second single blade impeller to cause a gurgling and popping sound as the second single blade impeller moves and rotates through the body of water. In an example, the first single j blade comprises a first end having a first blunt shape, and wherein the second single j blade comprises a second end having a second blunt shape. These and other features are described in more detail throughout the present specification and more particularly below.

Figure 8:
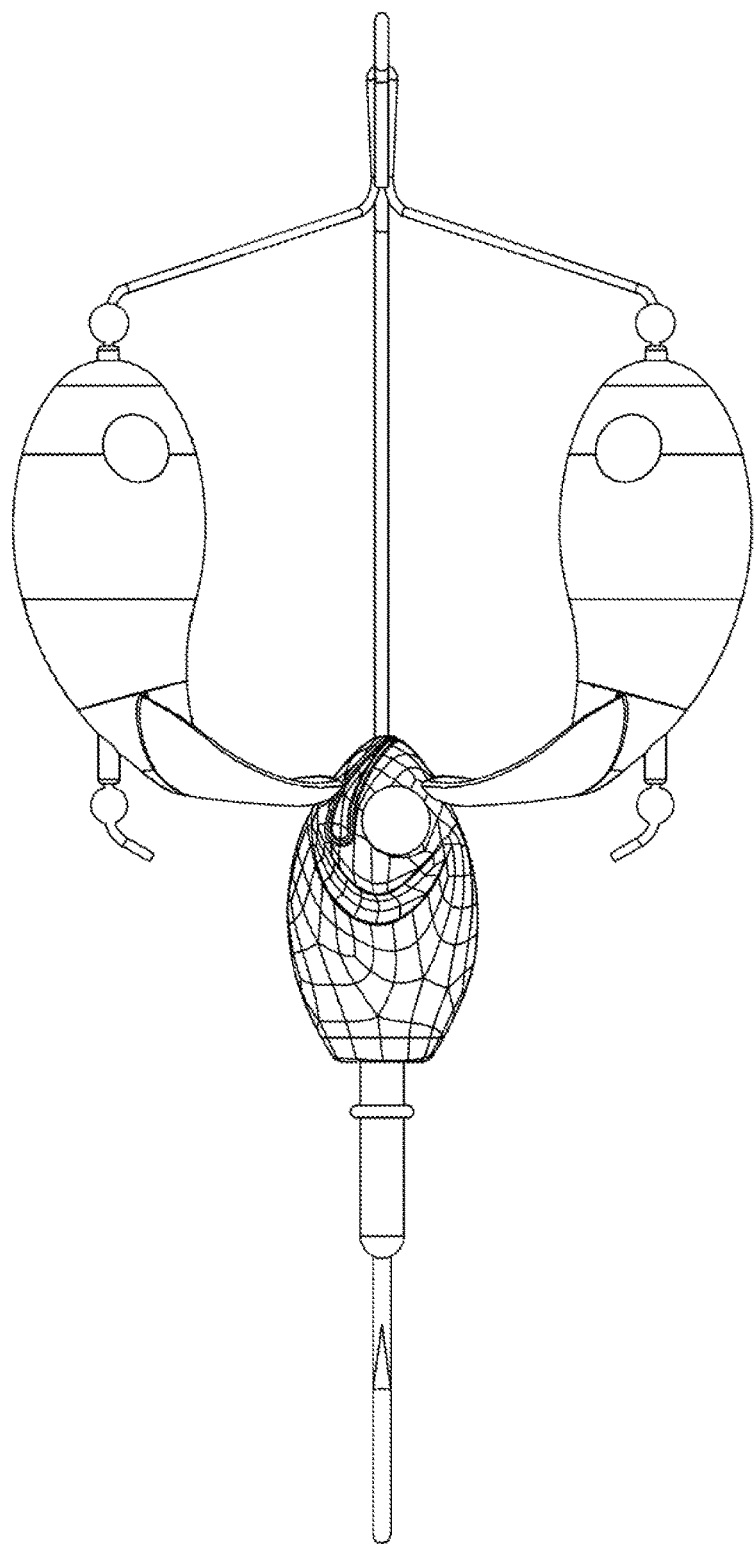
FIG. 8 is a top-view diagram of a lure device according to an example of the present invention.
Figure 9:
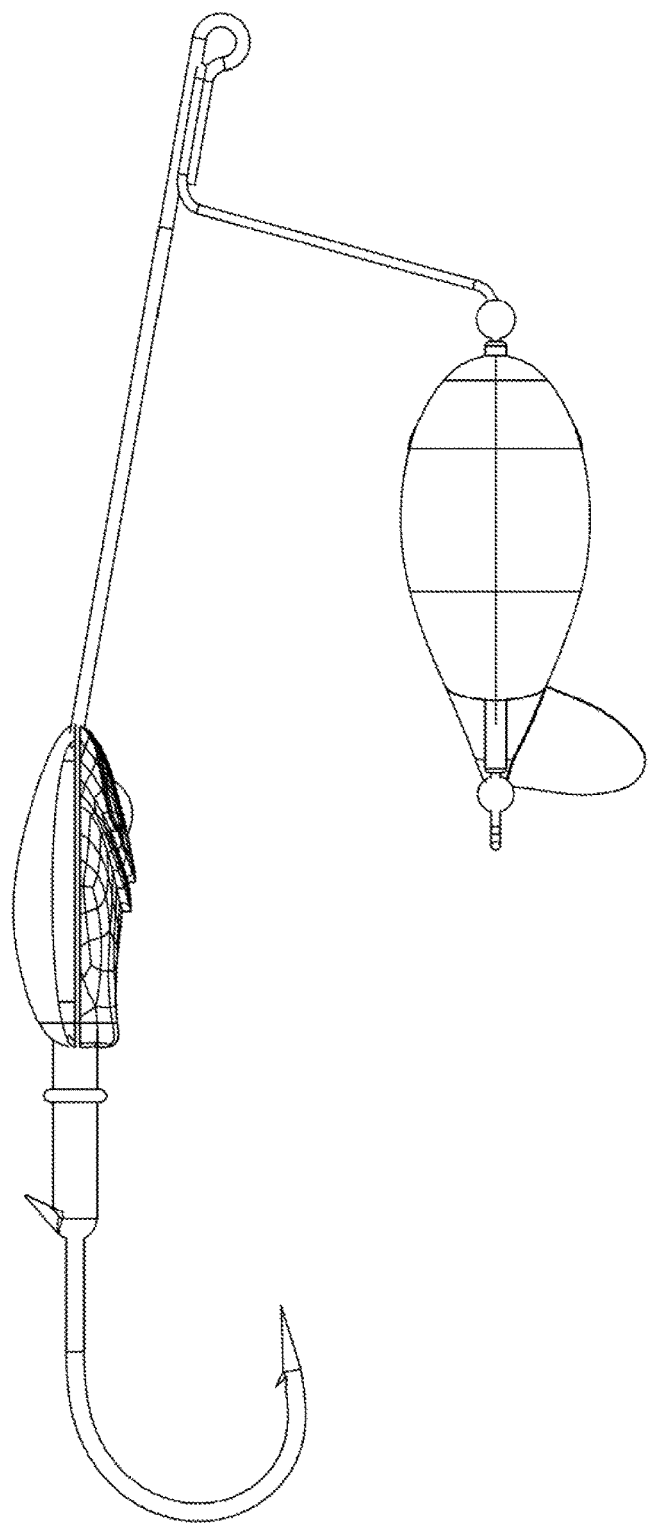
FIG. 9 is side view diagram of a lure device according to an example of the present invention.
Figure 10:
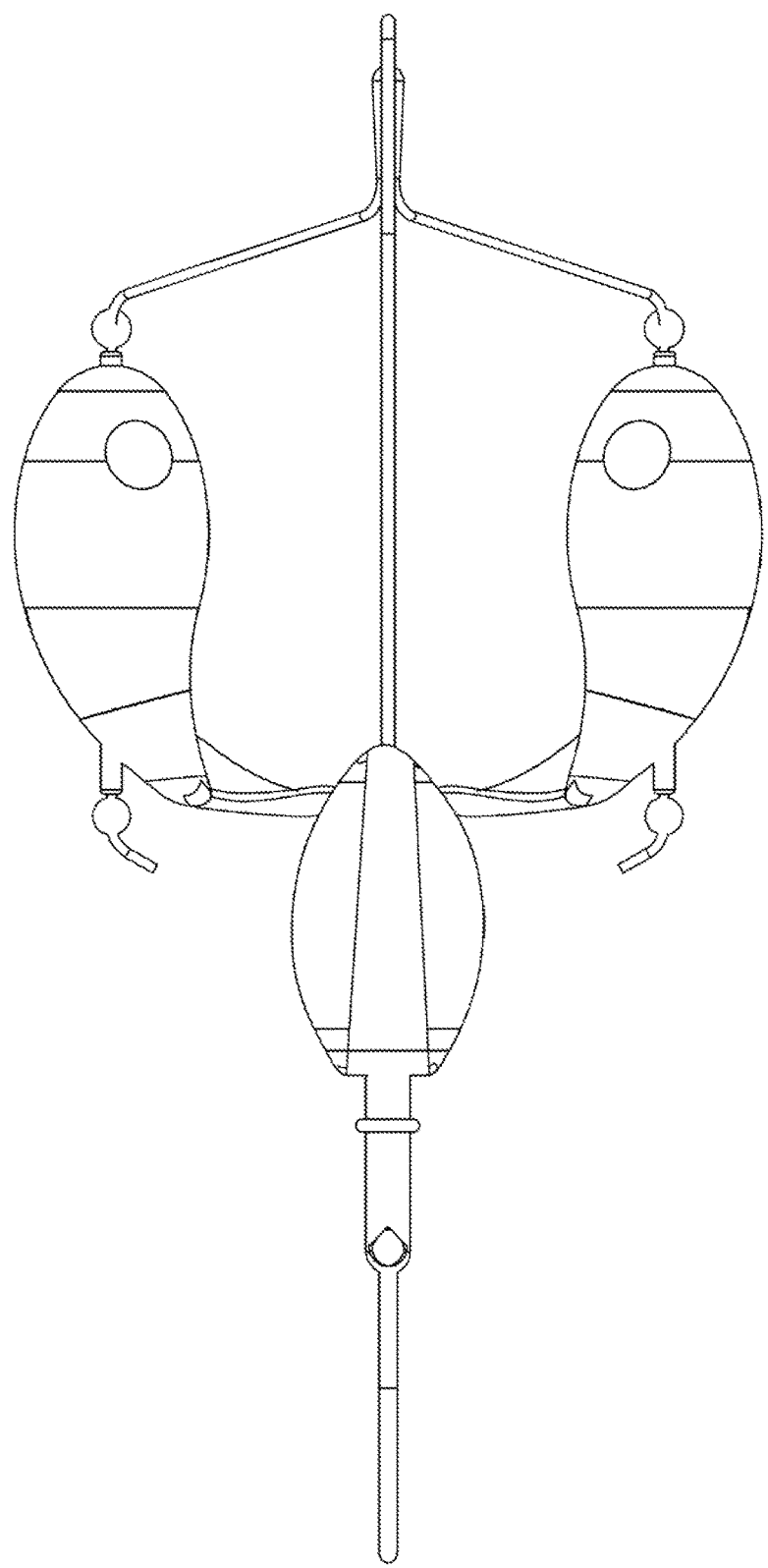
FIG. 10 is a bottom-view diagram of a lure device according to an example of the present invention.
Figure 11:
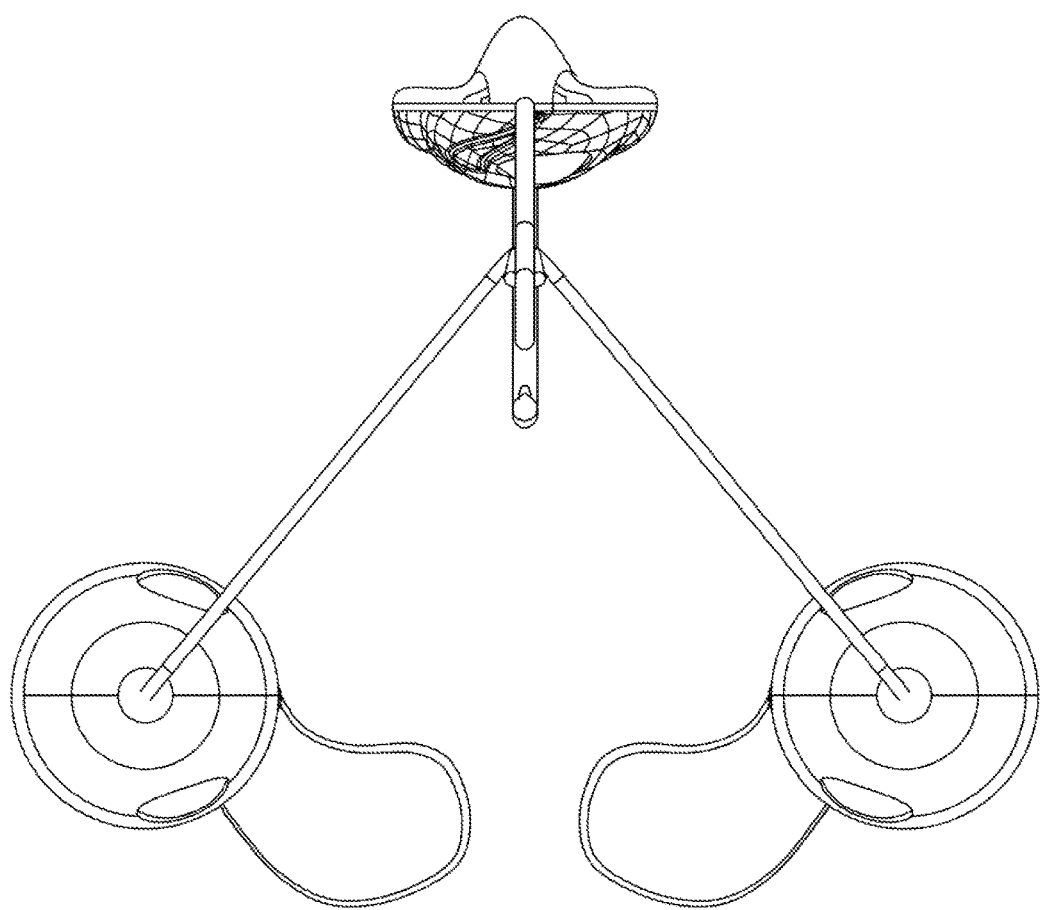
FIG. 11 is a front-view diagram of a lure device according to an example of the present invention.
Figure 12:
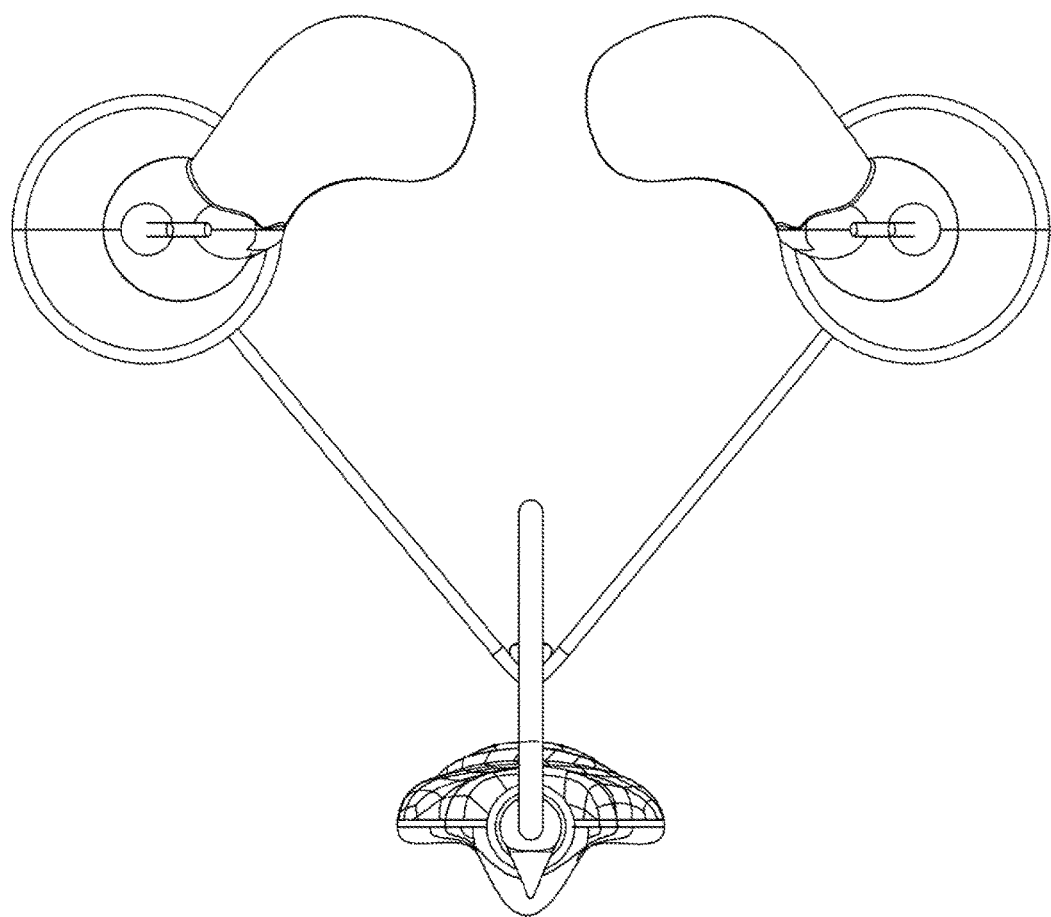
FIG. 12 is a back-view diagram of a lure device according to an example of the present invention.
Figure 13:
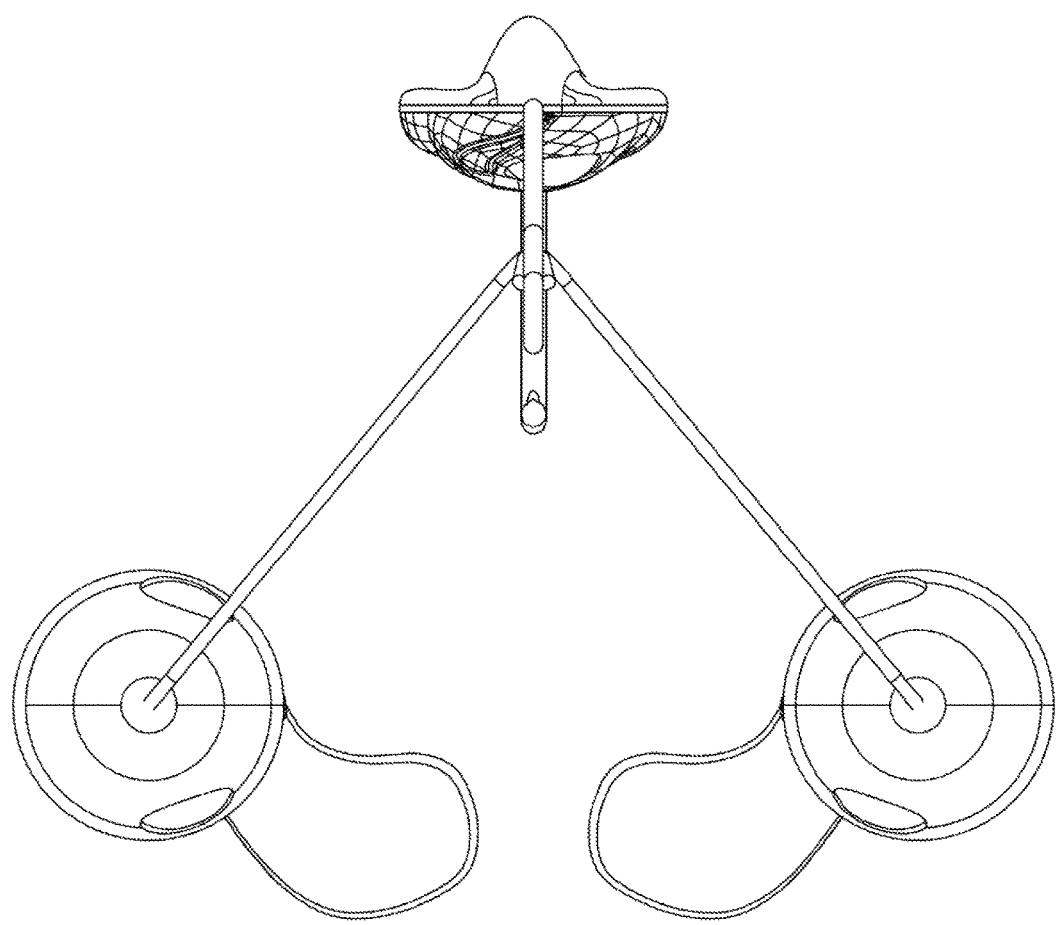
FIG. 13 is a front-view diagram of a lure device according to an example of the present invention.
Figure 14:
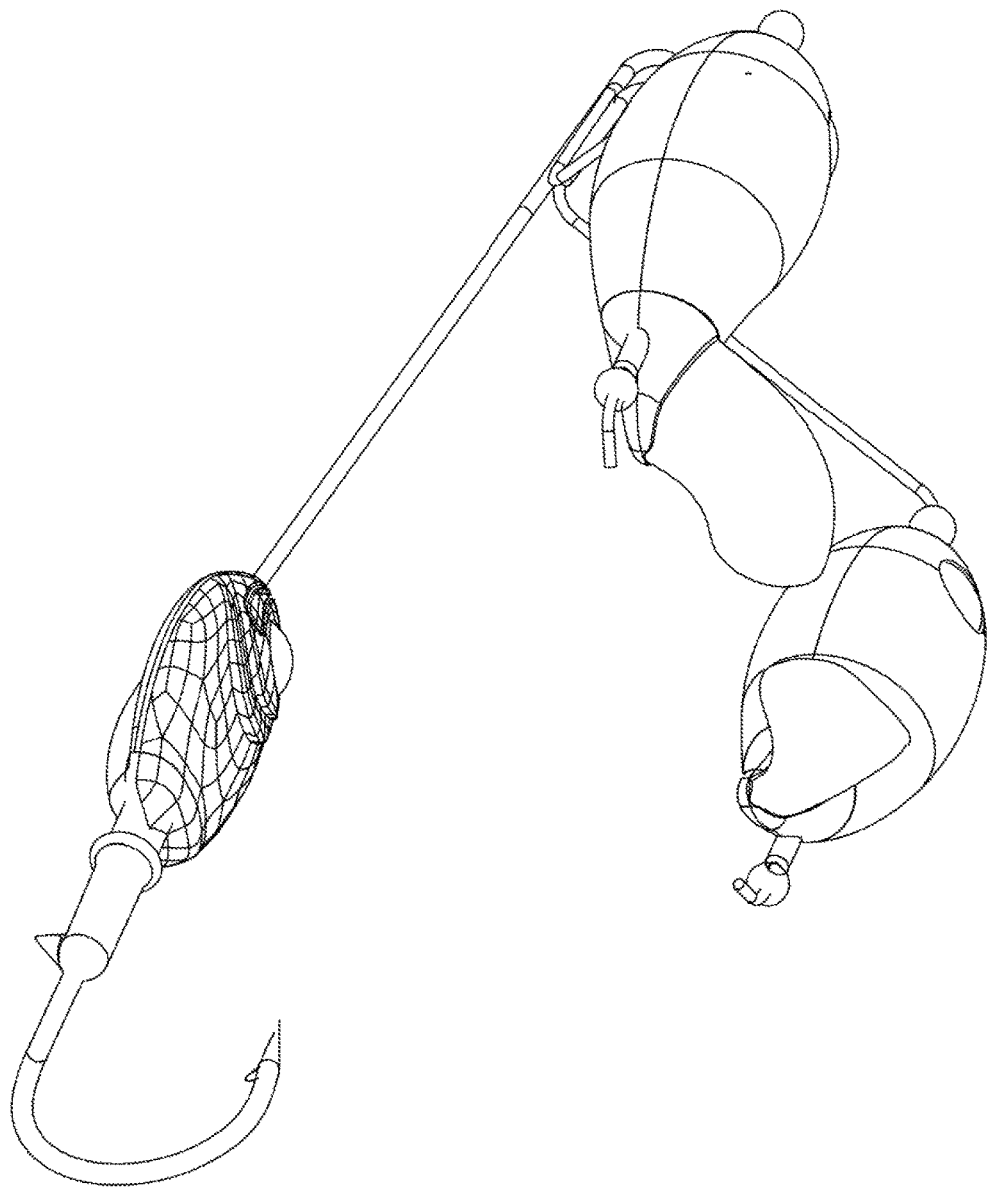
FIG. 14 is a perspective-view diagram of a lure device according to an example of the present invention.

Other views of examples are provided in accordance to the following drawings. FIG. 8 is a top-view diagram of a lure device according to an example of the present invention. FIG. 9 is side view diagram of a lure device according to an example of the present invention. FIG. 10 is a bottom-view diagram of a lure device according to an example of the present invention. FIG. 11 is a front-view diagram of a lure device according to an example of the present invention. FIG. 12 is a back-view diagram of a lure device according to an example of the present invention. FIG. 13 is a front-view diagram of a lure device according to an example of the present invention. FIG. 14 is a perspective-view diagram of a lure device according to an example of the present invention.

Figure 15A:
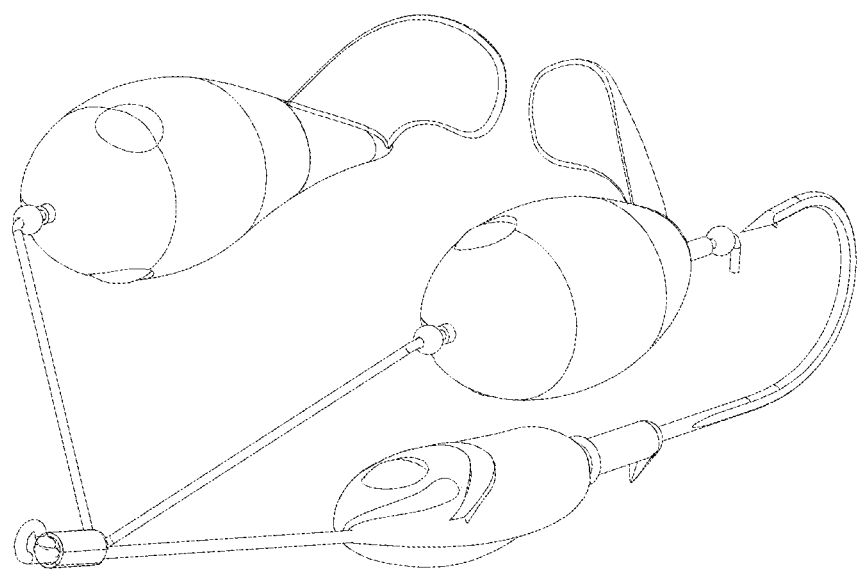
Figure 15C:
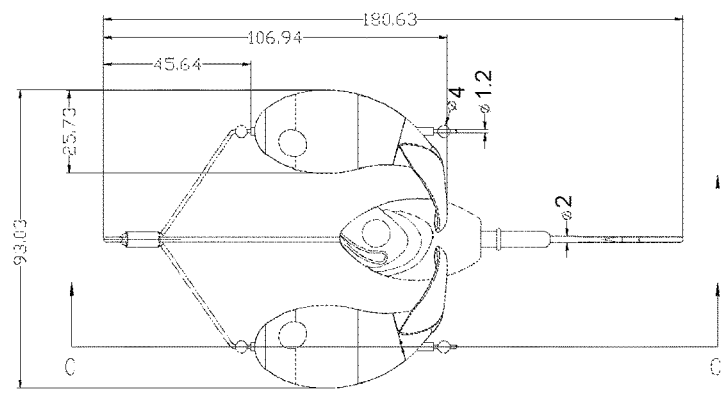
Figure 15C:
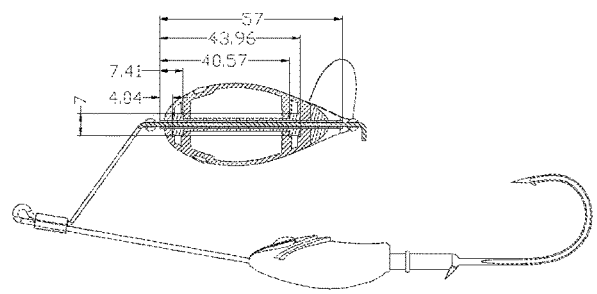
Figure 15C:
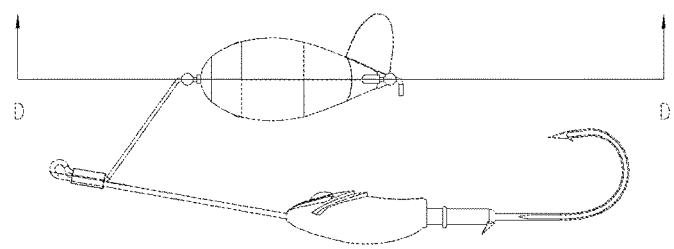
Figure 15C:
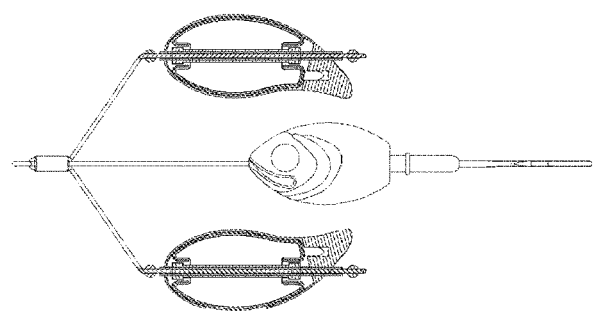

FIGS. 15A, 15B, and 15C are various illustrations of a lure device according to an example of the present invention. These drawings are mechanical in nature, and would enable the design, manufacture, and other aspects of the invention.

In an example, the present assignee, River2Sea has manufactured the following device to enable the invention described in this specification.

| Model | Description | Wt. (oz) | L. (in) | Hook | Action |
| --- | --- | --- | --- | --- | --- |
| DP148 | Double Plopper 148 | 5/8 | 5 3/4 | River2Sea Big Bite (BN) 2X Strong # 5/0 | Floating |

Of course, there can be other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims. As used herein, the term impeller can be a blade, propeller, or other rotating object. As an example, the method and device can be applied to other types of fishing lures such as minnows, snakes, mice, ducks, and others. Of course, there can be other variations, modifications, and alternatives.

The invention claimed is:

1. A floating fishing lure device, comprising:
    a eye configured from a wire and having an opening to attach a fishing line thereto;
    a first wire member having a first end extending from the eye and having a length ranging from one inch to ten inches from the first end to a second end;
    a bait device attached to the second end, the bait having a head member, and at least one hook configured in a manner where a point of the hook is directed back toward the eye;
    a skirt configured around a vicinity of the head member such that the skirt flutters as the bait device is moved through a body of water;
    a pair of support wires each of which is extending from the eye and each of which has a first length configured in a parallel manner to the first wire, and abutting the first wire;
    a first one of the pair of support wires extending from the first length and a second one of the pair of support wires extending from the first length such that the first one of the pair of support wires and the second one of the pair of support wires forms a v-shaped configuration in symmetry about the first wire member and having an angle defining the v-shaped member ranging from 90 Degrees to 30 Degrees, as viewed from an upper region of the v-shaped member, while the first wire is configured between the first one of the pair of support wires and the second one of the support wires;
    a first angle defining a first shape of the first one of the pair of support wires in reference to the first wire member when viewed from a side region of the bait device;
    a second angle defining second shape of the second one of the pair of support wires in reference to the first wire member when viewed from the side region of the bait device;
    a first support region configured from a first end portion of the first one of the pair of support wires, the first support region configured in a parallel manner to the length of the first wire;
    a second support region configured from a second end portion of the second one of the pair of support wires, the first support region configured in a parallel manner to the length of the first wire;
    a first height defining a first gap between the length of the first wire and the second support wire;
    a second height defining a second gap between the length of the first wire and the second support wire;
    a first floating member configured on the first support region and a second floating member configured on the second support region, such that the first floating member and the second floating member cause the bait device to suspend motionless in the body of water, while the first floating member and the second floating member are motionless in the body of water;
    a first single blade impeller configured using an opening on the impeller to communicate to the first support region and a second single blade impeller configured using an opening on the impeller to communicate to the first support region, such that each of the first single blade impeller and the second single blade impeller spin and cause a gurgling sound as the bait device is pulled through the body of water at a first retrieving speed.

2. The device of claim 1 wherein the first gap and the second gap is equal in distance.

3. The device of claim 2 wherein each of the first floating member and the second floating member is configured from a floating plastic or other material in an egg shaped manner.

4. The device of claim 3 wherein each of the first single blade impeller and the second single blade impeller spin and cause a buzzing sound as the bait device is pulled through the body of water at a second retrieving speed, the second retrieving speed is faster than the first retrieving speed.

5. The device of claim 4 wherein each of the first single blade impeller and the second single blade impeller spin and cause a popping sound as the bait device is pulled through the body of water at a third retrieving speed, the third retrieving speed is faster than the second retrieving speed.

6. The device of claim 5 wherein the bait device comprises a solid metal head material.

7. The device of claim 6 wherein each of the first single blade impeller and the second single blade impeller extends to the head member and not beyond the head member to allow the hook to be in a weed-less configuration such that the v-shaped member and each of the first single blade impeller and the second single blade impeller acts as a block for weeds as the device is pulled through the body of water.

8. The device of claim 7 wherein the first angle ranges from about 45 Degrees to 90 Degrees.

9. The device of claim 8 wherein the first single blade impeller is exposed to the body of water; and wherein the second single blade impeller is exposed to the body of water.

10. The device of claim 9 wherein the first floating member and the second floating member are configured with air or other floating material suitable to cause the bait device to suspend and not sink into the body of water while the bait is in a motionless state.

11. The device of claim 10 wherein the first single blade impeller comprises a bearing or bushing coupled to the first support wire; and wherein the second single blade impeller comprises a bearing or bushing coupled to the second support wire, each bearing or bushing facilitating rotation of each of the first single blade impeller and the second single blade impeller.

12. The device of claim 11 wherein the bait device is shaped as a flat blade member and configured such that each side of the blade member is substantially parallel to a surface region of the body of water.

13. The device of claim 12 wherein the first single blade impeller and the second single blade impeller turn in an opposite direction from each other, and each of the first single blade impeller and the second single blade impeller turn in a direction toward each other or turn in a direction away from each other.

14. The device of claim 12 wherein the first single blade comprises a first cone shaped structure having a first base and a first cone end formed in an off-set manner to a straight line running from the base to an outer side region of the first cone end, a first single j shaped blade coupled to the first cone end, a first opening extending straight along the straight line from the first base to the outer side region of the first cone end such that the first single j shaped blade is configured on an inner side region of the first cone, and the first single blade is coupled to the first wire support in an off-set manner to cause the first single blade to rotate about the first wire support in an off-set manner to cause the first single blade impeller to cause a gurgle and popping sound as the first single blade impeller moves and rotates through the body of water.

15. The device of claim 14 wherein the second single blade comprises a second cone shaped structure having a second base and a second cone end formed in an off-set manner to a straight line running from the base to an outer side region of the second cone end, a second single j shaped blade coupled to the second cone end, a second opening extending straight along the straight line from the second base to the outer side region of the second cone end such that the second single j shaped blade is configured on an inner side region of the second cone, and the second single blade is coupled to the second wire support in an off-set manner to cause the second single blade to rotate about the second wire support in an off-set manner to cause the second single blade impeller to cause a gurgling and popping sound as the second single blade impeller moves and rotates through the body of water.

16. The device of claim 15 wherein the first single j blade comprises a first end having a first blunt shape, and wherein the second single j blade comprises a second end having a second blunt shape.

17. A floating fishing lure device, comprising:
a eye configured from a wire and having an opening to attach a fishing line thereto;
a first wire member having a first end extending from the eye and having a length ranging from one inch to ten inches from the first end to a second end;
a bait device attached to the second end, the bait having a head member, and at least one hook configured in a manner where a point of the hook is directed back toward the eye;
a pair of support wires each of which is extending from the eye and each of which has a first length configured in a parallel manner to the first wire, and abutting the first wire;
a first one of the pair of support wires extending from the first length and a second one of the pair of support wires extending from the first length such that the first one of the pair of support wires and the second one of the pair of support wires forms a v-shaped configuration in symmetry about the first wire member and having an angle defining the v-shaped member ranging from 120 Degrees to 20 Degrees, as viewed from an upper region of the v-shaped member, while the first wire is configured between the first one of the pair of support wires and the second one of the support wires;
a first angle defining a first shape of the first one of the pair of support wires in reference to the first wire member when viewed from a side region of the bait device;
a second angle defining second shape of the second one of the pair of support wires in reference to the first wire member when viewed from the side region of the bait device;
a first support region configured from a first end portion of the first one of the pair of support wires, the first support region configured in a parallel manner to the length of the first wire;
a second support region configured from a second end portion of the second one of the pair of support wires, the first support region configured in a parallel manner to the length of the first wire;
a first height defining a first gap between the length of the first wire and the second support wire;
a second height defining a second gap between the length of the first wire and the second support wire;
a first floating member configured on the first support region and a second floating member configured on the second support region, such that the first floating member and the second floating member cause the bait device to suspend motionless in the body of water, while the first floating member and the second floating member are motionless in the body of water;
a first single blade impeller configured using an opening on the impeller to communicate to the first support region and a second single blade impeller configured using an opening on the impeller to communicate to the first support region, such that each of the first single blade impeller and the second single blade impeller spin and cause a gurgling sound as the bait device is pulled through the body of water at a first retrieving speed.

18. The device of claim 17 wherein the first single blade comprises a first cone shaped structure having a first base and a first cone end formed in an off-set manner to a straight line running from the base to an outer side region of the first cone end, a first single j shaped blade coupled to the first cone end, a first opening extending straight along the straight line from the first base to the outer side region of the first cone end such that the first single j shaped blade is configured on an inner side region of the first cone, and the first single blade is coupled to the first wire support in an off-set manner to cause the first single blade to rotate about the first wire support in an off-set manner to cause the first single blade impeller to cause a gurgle and popping sound as the first single blade impeller moves and rotates through the body of water.

19. The device of claim 18 wherein the second single blade comprises a second cone shaped structure having a second base and a second cone end formed in an off-set manner to a straight line running from the base to an outer side region of the second cone end, a second single j shaped blade coupled to the second cone end, a second opening extending straight along the straight line from the second base to the outer side region of the second cone end such that the second single j shaped blade is configured on an inner side region of the second cone, and the second single blade is coupled to the second wire support in an off-set manner to cause the second single blade to rotate about the second wire support in an off-set manner to cause the second single blade impeller to cause a gurgling and popping sound as the second single blade impeller moves and rotates through the body of water.

20. The device of claim 19 wherein the first single j blade comprises a first end having a first blunt shape, and wherein the second single j blade comprises a second end having a second blunt shape.

* * * * *